(12) United States Patent
Sim

(10) Patent No.: US 6,523,630 B2
(45) Date of Patent: Feb. 25, 2003

(54) CONSTANT SPEED CONTROLLING DEVICE AND METHOD

(75) Inventor: Mike Sim, Taoyuan Sien (TW)

(73) Assignee: Delta Electronics, Inc., Taoyuan Sien (TW)

( * ) Notice: Subject to any disclaimer, the term of this patent is extended or adjusted under 35 U.S.C. 154(b) by 15 days.

(21) Appl. No.: 09/764,751

(22) Filed: Jan. 18, 2001

(65) Prior Publication Data

US 2002/0092689 A1 Jul. 18, 2002

(51) Int. Cl.[7] ................................................ B60K 31/04
(52) U.S. Cl. ........................................ 180/179; 180/65.1
(58) Field of Search .............................. 180/170, 178, 180/179, 65.1; 701/22, 70

(56) References Cited

U.S. PATENT DOCUMENTS

| | | | | |
|---|---|---|---|---|
| 4,796,716 A | * | 1/1989 | Masuda .................... 180/176 |
| 5,024,284 A | * | 6/1991 | Nakano et al. ............. 180/179 |
| 5,161,634 A | * | 11/1992 | Ichihara et al. ............. 180/179 |
| 5,243,523 A | * | 9/1993 | Stepper et al. ............ 364/424.1 |
| 6,122,588 A | * | 9/2000 | Shenhan et al. ............... 701/93 |
| 6,202,779 B1 | * | 3/2001 | Musat ........................ 180/170 |
| 6,283,240 B1 | * | 9/2001 | Beever ....................... 180/178 |
| 6,324,464 B1 | * | 11/2001 | Lee et al. ..................... 701/93 |

* cited by examiner

*Primary Examiner*—Paul N. Dickson
*Assistant Examiner*—Laura B. Rosenberg
(74) *Attorney, Agent, or Firm*—Thomas, Kayden, Horstemeyer & Risley

(57) ABSTRACT

Disclosed is a constant speed controlling device and method to be applied in the electric devices or vehicles which need to be operated automatically at constant speeds. The constant speed controlling device includes a detector for detecting a running speed of the electric device driven by a prime mover to generate a feedback signal, a controller electrically connected with the detector for converting the feedback signal to a digital signal to be compared with a predetermined value representative of the selectively designed speed so as to generate a control signal, and a driving device electrically connected with the controller for adjusting an output power of the prime mover and driving the prime mover corresponding to the control signal so as to allow the electric device to run at the selectively designed speed.

20 Claims, 2 Drawing Sheets

CONSTANT SPEED CONTROLLING DEVICE AND METHOD

FIELD OF THE INVENTION

The present invention is related to a constant speed controlling device and method, and especially to a constant speed controlling device and method for automatically operating an electric vehicle at a selectively designed speed.

BACKGROUND OF THE INVENTION

In recent years, more and more vehicles or electric vehicles are provided with a constant speed controlling device which can operate vehicles automatically at the constant speed after a user sets a desired speed. However, the constant speed function of an electric vehicle in the market is to only fix the output power of motor regardless of externally variable factors which may also affect the running speed of the vehicle, for example, wind direction, slope of road surface, and weather, etc. Furthermore, there is no feedback control signal generated from wheels to attain the purpose of actually operating vehicles at a constant speed.

Therefore, it is desirable to develop a constant speed controlling device and method to be applied in the electric vehicles so as to provide vehicle operators with comfortable and convenient feeling and to save the electric consumption of storage battery used for the electric vehicle.

SUMMARY OF THE INVENTION

An object of the present invention is to provide a constant speed controlling device and method to be applied in the electric devices or vehicles which needs to be operated automatically at constant speeds.

Another object of the present invention is to provide a constant speed controlling device and method adapted to be used with an electric vehicle to provide vehicle operators with comfortable and convenient feeling and to save the electric consumption of storage battery for the electric vehicle.

According to the present invention, the constant speed controlling device for automatically operating an electric device driven by a prime mover at a selectively designed speed includes a detector for detecting a running speed of the electric device to generate a feedback signal; a controller electrically connected with the detector for converting the feedback signal to a digital signal to be compared with a predetermined value representative of the selectively designed speed so as to generate a control signal; and a driving device electrically connected with the controller for adjusting an output power of the prime mover and driving the prime mover corresponding to the control signal so as to allow the electric device to run at the selectively designed speed.

Certainly, the electric device can be an electric vehicle or a mowing machine, for instance, an electric bicycle, an electric motorcycle, an electric automobile, an electric truck, and a skateboard, etc.

Preferably, the prime mover is a motor, and the prime mover and the constant speed controlling device are powered by a storage battery.

In accordance with one aspect of the present invention, the controller includes a microprocessor or a microcomputer. The controller further includes a register for storing the predetermined value and the digital signal and an operator electrically connected with the register for comparing the digital signal and the predetermined value to determine an output state of the control signal. The control signal is a pulse width modulation (PWM) signal, wherein the duty cycle of this pulse width modulation signal is increased by the operator when the running speed of the electric device is less than the selectively designed speed, but the duty cycle of the pulse width modulation signal is decreased by the operator when the running speed of the electric device is greater than the selectively designed speed.

In addition, the constant speed controlling device further includes a control switch electrically connected with the register for actuating the controller to memorize the running speed of the electric device in the register to be compared with the selectively designed speed. Preferably, the control switch is a constant speed control button for allowing a user to optionally select the desired speed.

Moreover, the present invention also provides a constant speed controlling method for automatically operating an electric device driven by a prime mover at a selectively designed speed. This method includes the steps of a) providing a feedback signal corresponding to a running speed of the electric device; b) converting the feedback signal to a digital signal to be compared with a predetermined value representative of the selectively designed speed so as to generate a control signal; and c) adjusting an output power of the prime mover and driving the prime mover corresponding to the control signal so as to allow the electric device to run at the selectively designed speed. The output power of the prime mover is increased in the presence of a resisting force to allow the electric device to run at the selectively designed speed, but the output power of the prime mover is decreased when the resisting force is eliminated so as to save the electric consumption of the storage battery.

The resisting force comes from the wind direction, wind force, weather, slope of road surface and paving condition, etc.

The present invention may best be understood through the following description with reference to the accompanying drawings, in which:

DETAILED DESCRIPTION OF THE PREFERRED EMBODIMENT

The present invention will now be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

The present invention discloses a constant speed controlling device adapted to be applied in an electric device such as an electric vehicle (for example, an electric bicycle, an electric motorcycle, an electric automobile, an electric truck, and a skateboard, etc.) or a mowing machine. For convenience's sake, an electric vehicle is exemplified for the detailed description.

Figure 1:
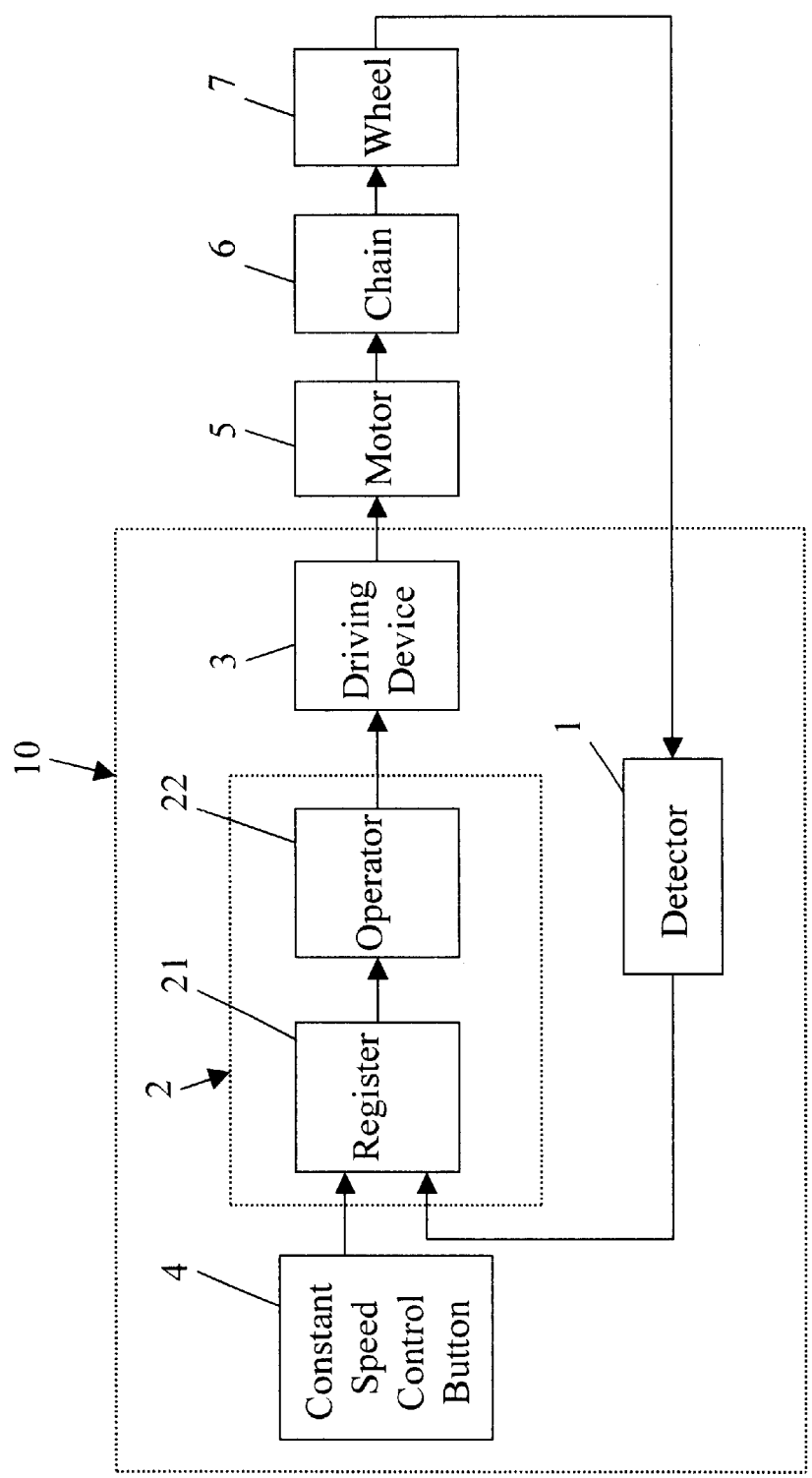
FIG. 1 is a block diagram showing a preferred embodiment of the constant speed controlling device of the present invention.

Now, please refer to FIG. 1 which is a block diagram showing a preferred embodiment of the constant speed controlling device of the present invention. This constant speed controlling device 10 for automatically operating an electric vehicle driven by a motor 5 at a selectively designed speed includes a detector 1 for detecting a running speed of the electric device to generate a feedback signal, a controller 2 electrically connected with the detector 1 for converting the feedback signal to a digital signal to be compared with a predetermined value representative of the selectively designed speed so as to generate a control signal, and a driving device 3 electrically connected with the controller 2 for continuously adjusting an output power of the motor 5 and driving the motor 5 corresponding to the control signal so as to allow the electric device to run at the selectively designed speed.

The controller 2 includes a microprocessor or a microcomputer which includes a register 21 for storing the predetermined value and the digital signal to be stored therein, and an operator 22 electrically connected with the register 21 for comparing the digital signal and the predetermined value to determine an output state of the control signal. The control signal is a pulse width modulation (PWM) signal, wherein a duty cycle of the pulse width modulation signal is increased by the operator when the running speed of the electric vehicle is less than the selectively designed speed; while the running speed of the electric vehicle is greater than the selectively designed speed, the duty cycle of the pulse width modulation signal is decreased by the operator 22.

The driving device 3 can continuously adjust the output power of the motor 5 corresponding to the output state of the PWM signal to further drive the motor 5 so as to have the electric device automatically operate at the selectively designed speed.

A vehicle operator can actuate the controller 2 to memorize the running speed of the electric device in the register to be compared with the selectively designed speed through a constant speed control button 4 electrically connected with the register 21 for allowing the vehicle operator to optionally select the designed speed.

The motor 5 and the constant speed controlling device 10 are powered by a storage battery (not shown). The output power of the motor 5 can be increased by the driving device 3 in the presence of a resisting force (coming from the wind direction, wind force, weather, slope of road surface, and paving condition, etc.) to allow the electric device to run at the selectively designed speed, but the output power of the motor 5 is decreased when the resisting force is reduced or eliminated so as to save the electric consumption of the storage battery.

Figure 2:
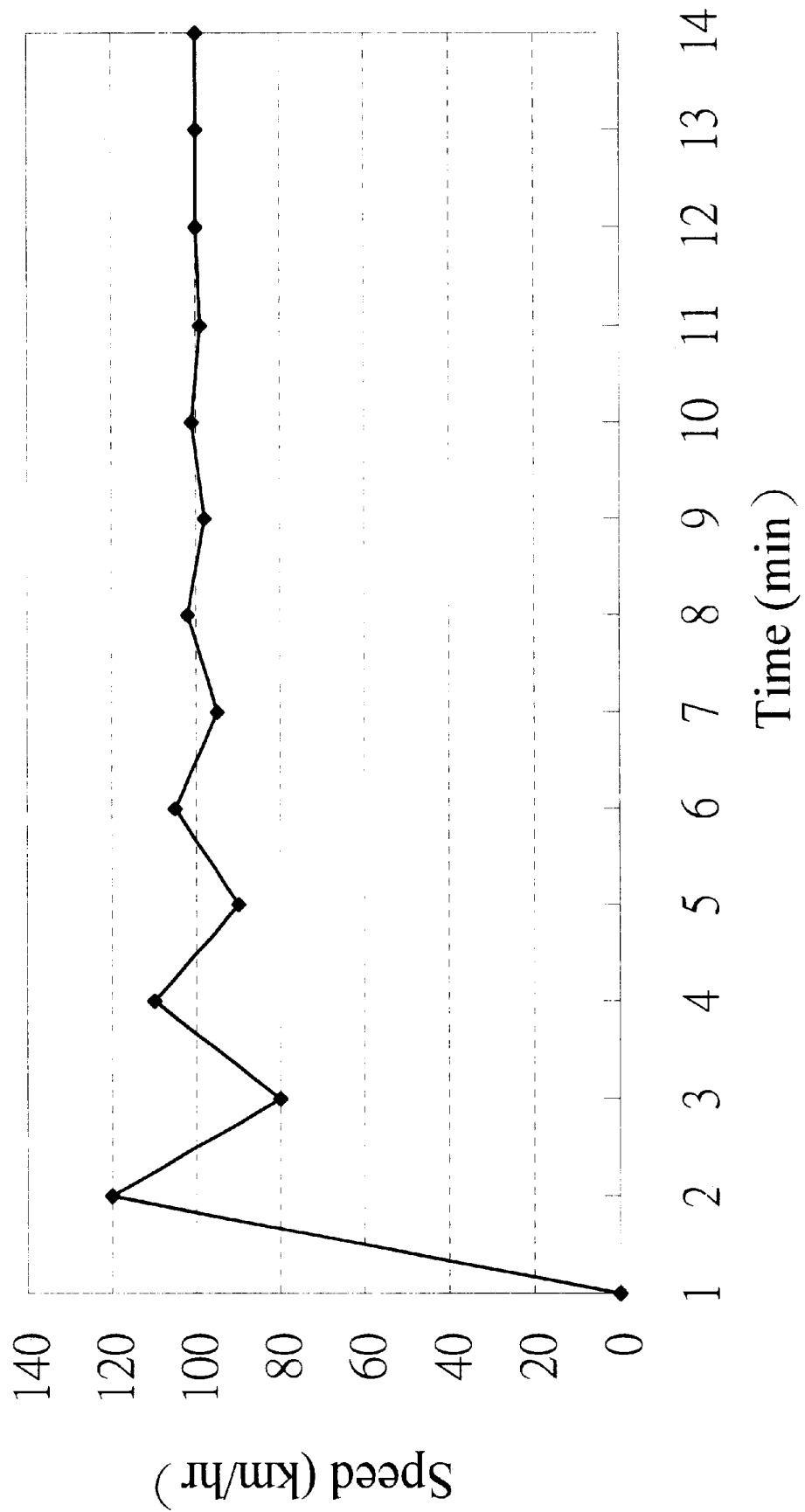
FIG. 2 is a graph showing the relationship between the speed and time obtained after testing the constant speed controlling device of the present invention.

When the vehicle operator starts the constant speed function by pressing the constant speed control button 4, the actually running speed of the vehicle will be memorized in the register 21 of the microcomputer immediately to perform a feedback control. The operation of the motor 5 will drive the chain 6 and the revolution of the chain 6 will drive the wheel 7 to rotate for driving the electric vehicle to run. The speed of electric vehicle can be detected by the detector 1 installed on the wheel 7 for generating a feedback signal to be sent to the microcomputer. Thereafter, the feedback signal is converted into a digital signal to be compared with the predetermined value representative of the designed speed stored in the register 21 of the microcomputer. After the operation of the operator 22 in the microcomputer, the operater 22 will output a PWM signal and determine an output state of this signal. Then, the motor 4 is driven by the driving device 3 according to the new PWM signal. Thus, the whole process can be repeated continuously to achieve the purpose of operating the electric vehicle at a designed constant speed. As shown in FIG. 2, if the desired speed of an electric bicycle is set at 100 km/hr, the target speed can be attained in a temporarily adjusting time. Certainly, the required time for adjusting the actually running speed to the desired speed varies along with the type of electric vehicle and the internal circuit design of the constant speed controlling device. Generally, the adjusting time ranges from several seconds to several minutes.

In conclusion, the running speed of electric vehicle may be affected by some externally variable factors such as wind direction or the slope of road surface. In order to attain the purpose of allowing the vehicle to operate at constant speeds, the output power of the motor must be adjusted continuously due to the proportional relation between the resisting force and the power. The revolution speed of the chain must be greater than the rotation speed of wheel such that the running speed of vehicle can be increased. If the revolution speed of the chain must be less than the rotation speed of wheel, the running speed of the electric vehicle can be increased by accumulating the externally variable factors instead of outputting the power to drive the motor so that the output power for the electric vehicle can be saved and the electric consumption of battery can also be reduced, thereby elongating the traveling time of electric vehicle. In addition, the electric vehicle provided with the constant speed controlling device of the present invention can allow the vehicle operator to have comfortable and convenient feeling.

Of course, except that the constant speed controlling device and method of the present invention can be applied in the electric vehicles such as an electric bicycle, an electric motorcycle, an electric automobile, an electric truck, and a skateboard, it can also be used with other electric devices which needs to be operated automatically at constant speeds, for instance, a mowing machine.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A constant speed controlling device for automatically operating an electric device driven by a prime mover at a selectively designed speed, comprising:

a detector for detecting a running speed of said electric device to generate a feedback signal;

a controller electrically connected with said detector for converting said feedback signal into a digital signal to be compared with a predetermined value representative of said selectively designed speed so as to generate a control signal, wherein said controller further comprises:

a register for storing said digital signal and a predetermined value;

an operator for comparing said digital signal and said predetermined value to determine an output state of said control signal; and a driving device for adjusting an output power of said prime mover and driving said prime mover corresponding to said control signal so as to allow said electric device to run at said selectively designed speed.

2. The constant speed controlling device according to claim 1, wherein said electric device is an electric vehicle or a mowing machine.

3. The constant speed controlling device according to claim 2, wherein said electric vehicle is an electric bicycle, an electric motorcycle, an electric automobile, an electric truck or a skateboard.

4. The constant speed controlling device according to claim 1 wherein said prime mover is a motor.

5. The constant speed controlling device according to claim 1 wherein said prime mover and said constant speed controlling device are powered by a storage battery.

6. The constant speed controlling device according to claim 1, wherein said controller is a microprocessor or a microcomputer.

7. The constant speed controlling device according to claim 6 further comprising a control switch electrically connected with said register for actuating said controller to memorize said running speed of said electric device in said register to be compared with said selectively designed speed.

8. The constant speed controlling device according to claim 7 wherein said control switch is a constant speed control button for allowing a user to optionally select said designed speed.

9. The constant speed controlling device according to claim 6 wherein said control signal is a pulse width modulation (PWM) signal.

10. The constant speed controlling device according to claim 9 wherein a duty cycle of said pulse width modulation signal is increased by said operator when said running speed of said electric device is less than said selectively designed speed.

11. The constant speed controlling device according to claim 9 wherein a duty cycle of said pulse width modulation signal is decreased by said operator when said running speed of said electric device is greater than said selectively designed speed.

12. A constant speed controlling method for automatically operating an electric device driven by a prime mover at a selectively designed speed, comprising the steps of:
 a) detecting a running speed of said electric device to generate a feedback signal;
 b) converting said feedback signal into digital signal by a controller, wherein said controller includes one of the group consisting of a microprocessor and a microcomputer, and said controller further includes a register electrically connected with said detector and an operator electrically connected with said register;
 c) storing said digital signal and a predetermined value by said register;
 d) comparing said digital signal and said predetermined value to determine an output state of said control signal by said operator; and
 e) adjusting an output power of said prime mover and driving said prime mover corresponding to said control signal so as to allow said electric device to run at said selectively designed speed.

13. The constant speed controlling method according to claim 12 wherein said control signal is a pulse width modulation (PWM) signal.

14. The constant speed controlling method according to claim 13 wherein a duty cycle of said pulse width modulation signal is increased by said operator when said running speed of said electric device is less than said selectively designed speed, and said duty cycle of said pulse width modulation signal is decreased by said operator when said running speed of said electric device is greater than said selectively designed speed.

15. A constant speed controlling device for automatically operating an electric device driven by a prime mover at a selectively designed speed, comprising:
 a detector for detecting a running speed of said electric device to generate a feedback signal;
 a controller electrically connected with said detector for converting said feedback signal into a digital signal to be compared with a predetermined value representative of said selectively designed speed so as to generate a control signal, wherein said controller further includes a register for storing said digital signal and said predetermined value, and an operator for comparing said digital signal and said predetermined value to determine an output state of said control signal; and
 a driving device electrically connected with said controller for adjusting an output power of said prime mover and driving said prime mover corresponding to said control signal, wherein said running speed of said electric device is decreased when the running speed is greater than said selectively designed speed and said running speed is increased when the running speed is less than said selectively designed speed for maintaining said running speed to approach said selectively designed speed.

16. The constant speed controlling device according to claim 15, wherein said control signal is a pulse width modulation (PWM) signal.

17. The constant speed controlling device according to claim 16, wherein a duty cycle of said pulse width modulation signal is increased by said operator when said running speed of said electric device is less than said selectively designed speed.

18. The constant speed controlling device according to claim 16, wherein a duty cycle of said pulse width modulation signal is decreased by said operator when said running speed of said electric device is greater than said selectively designed speed.

19. The constant speed controlling device according to claim 16, further comprising a control switch electrically connected with said register for actuating said controller to memorize said running speed of said electric device in said register to be compared with said selectively designed speed.

20. The constant speed controlling device according to claim 19, said control switch is a constant speed control button for allowing a user to optionally select said designed speed.

* * * * *